W. P. CLIFFORD & J. C. COOK.
ORE SEPARATING AND CONCENTRATING MACHINE.
APPLICATION FILED MAR. 16, 1912.

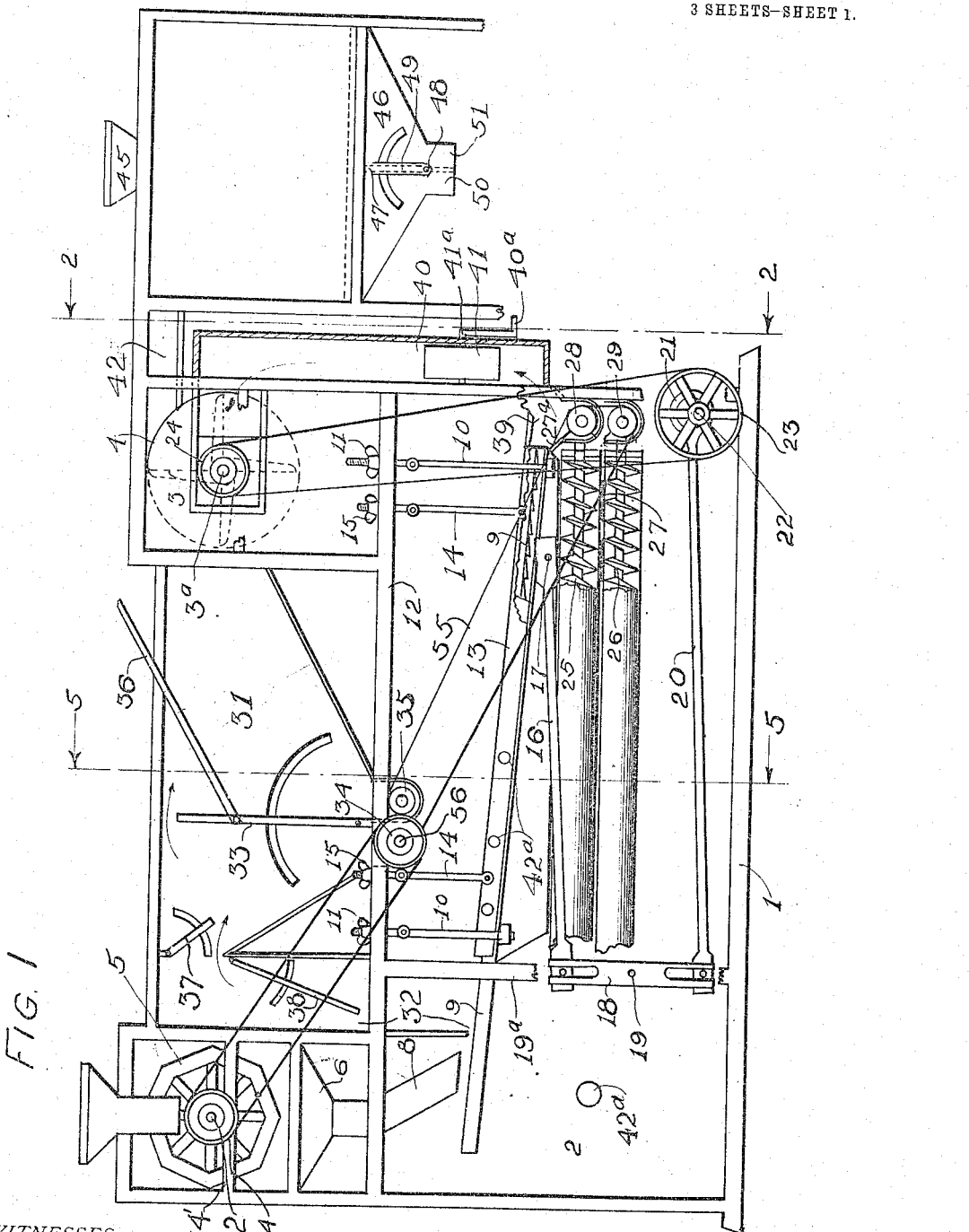

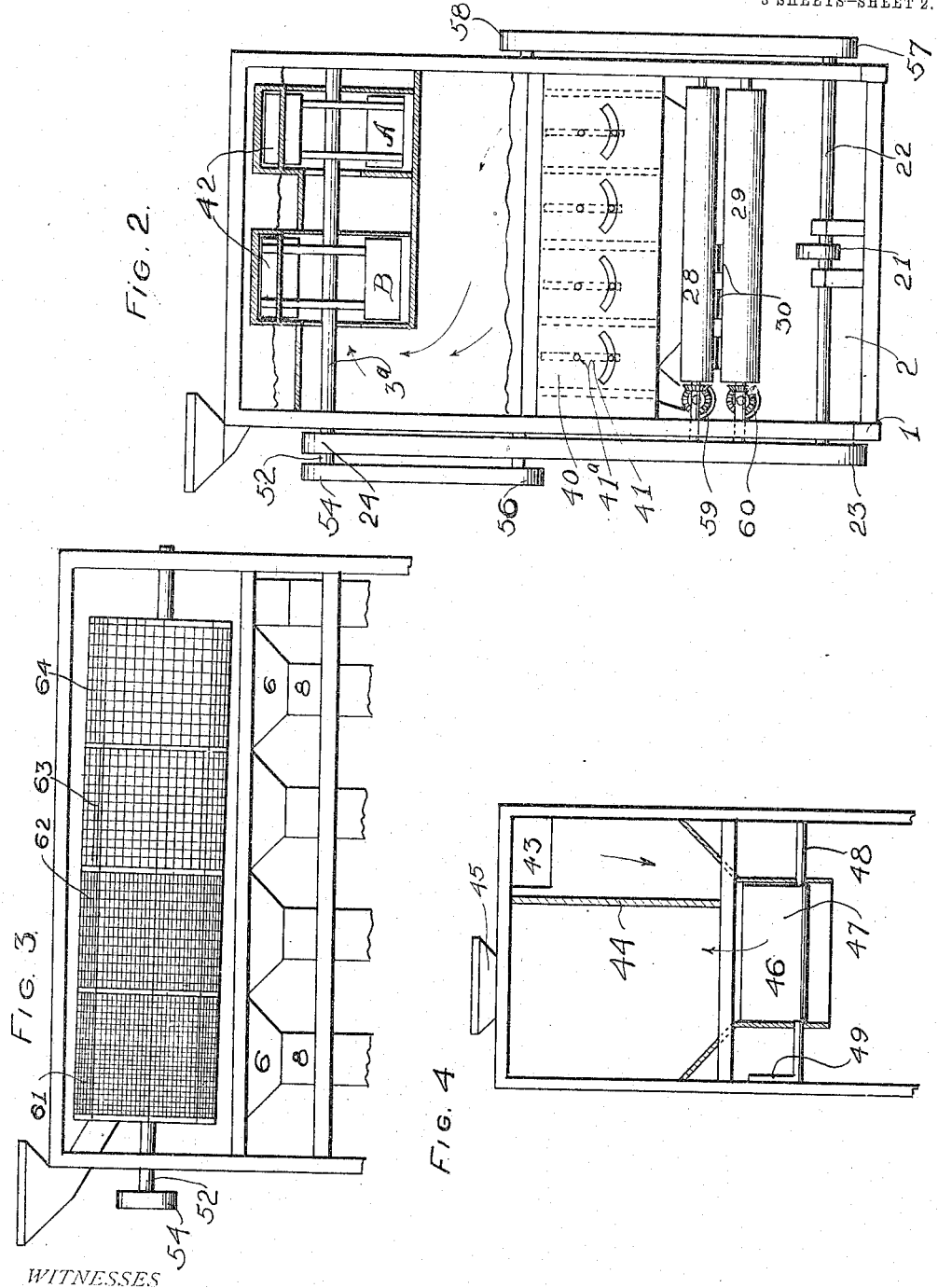

1,128,850.

Patented Feb. 16, 1915
3 SHEETS—SHEET 3.

WITNESSES
CW Rippey
Chas. C. Maddy.

INVENTORS
W. P. Clifford
John C. Cook
By W. D. Asbury, Attorney

UNITED STATES PATENT OFFICE.

WILLIAM P. CLIFFORD, OF OTTUMWA, AND JOHN C. COOK, OF RUSSELL, IOWA.

ORE SEPARATING AND CONCENTRATING MACHINE.

1,128,850.  Specification of Letters Patent.  Patented Feb. 16, 1915.

Application filed March 16, 1912. Serial No. 684,277.

*To all whom it may concern:*

Be it known that we, WILLIAM P. CLIFFORD and JOHN C. COOK, citizens of the United States, residing at Ottumwa, in the county of Wapello and State of Iowa, and at Russell, Lucas county, Iowa, respectively, have invented new and useful Improvements in Ore Separating and Concentrating Machines, of which the following is a specification.

The present invention relates to improvements in ore separating and concentrating machines, and the invention belongs to that type or class of machines in which the valuable particles of crushed or reduced ore are concentrated into as small a bulk as is economically advantageous by the fall of the particles in air currents. This concentration of particles is generally brought about by the fall of the particles in water; but as is well known, by this process the concentration depends upon the difference in specific gravity of the valuable ore and the waste vein stone or rock. The smaller particles of ore are separated by a variety of machines. The action of many of them is based upon the behavior of particles carried down an inclined plane by a thin stream of water. If the gradient of the plane and the strength of the thin current are properly arranged, the denser particles will be deposited and the specifically lighter ores washed away, although they may be equal falling if allowed to settle in deep water.

The paramount object of this invention is to overcome many of the difficulties experienced in concentrating in water, and to produce a generally improved ore separating and concentrating machine for the purpose of working dry ore, and owing to the fact that the fine dust from dry ore concentrations is so injurious to the health of persons working with such machines, is to produce a machine that will take care of such dust and protect the health of persons working with it.

The machine can be constructed of metals and glass, and will therefore withstand the weather of all climates.

With these and other ends in view, the invention consists in the novel construction, arrangement and combination of parts hereinafter described, illustrated in the accompanying drawings, and particularly pointed out in the appended claims.

Figure 5:
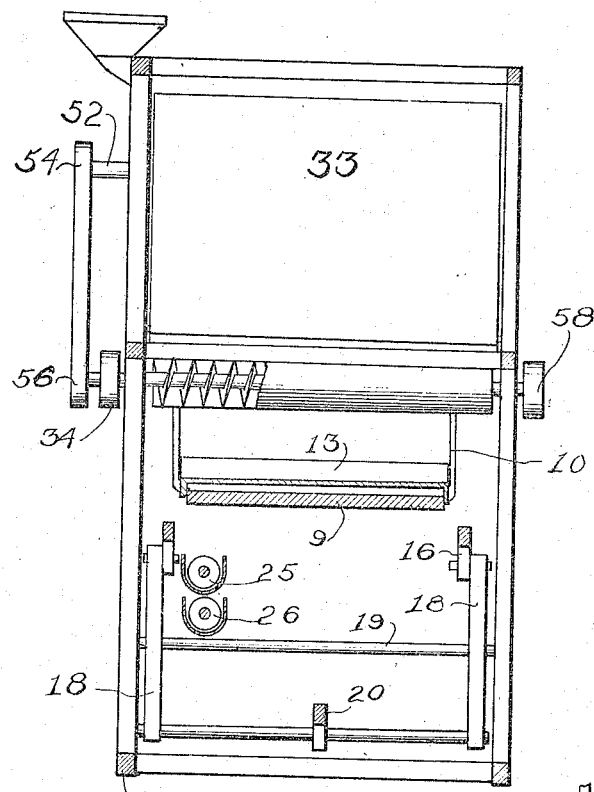
Figure 6:
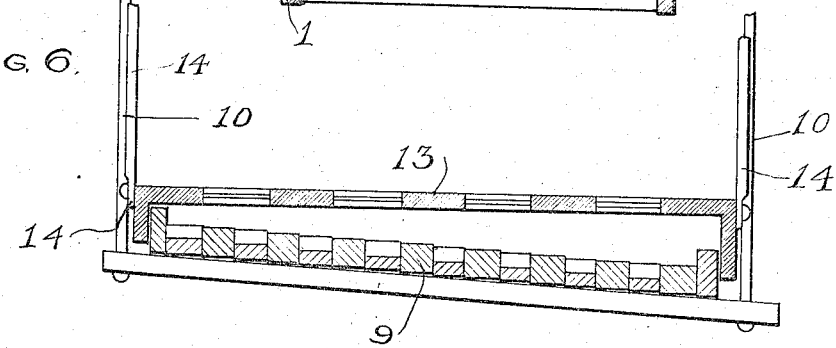
Figure 7:
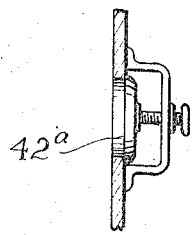

Referring to the drawings, forming a part of this specification, Figure 1, is a side view of machine with casing removed. Fig. 2, is a vertical sectional view on line 2—2 looking in direction of arrows. Fig. 3, is a view of sizing reel and chutes. Fig. 4, is section of dust collecting box. Fig. 5 is a vertical sectional view on line 5—5, Fig. 1, looking in direction of arrows. Fig. 6, is an enlarged sectional view of shaker plate, and frame carrying glass thereover. Fig. 7, is a view of screw check drafts in side of machine.

Referring now to drawings, the frame of the machine consists of suitable base beams 1, to which are secured the side and end walls 2. The machine is a dry worker, in which the various particles of ore are concentrated by means of air blasts and currents produced through the medium of suction fans 3 suitably mounted in a casing 4 located on the rear or fan end of the machine. The ore enters the machine after leaving the crusher through sizing reel 5 located either over or near feed end of the machine. The ores are conveyed from the sizing reel 5 by means of spouting 6 to chute 8 located at the front or main receiving portion of the machine, where they fall upon shaker plate 9.

This machine is designed to concentrate ore in very large quantities; there being but one unit here shown. The ores are concentrated and separated and carried through the machine through the medium of air currents and an inclined corrugated shaker plate 9 mounted and secured within the frame of the machine by means of adjusting rods 10 and thumb nuts 11, secured to frame 12 of the machine. Shaker plate 9 is inclined laterally as well as longitudinally and these inclinations may be changed as desired to provide for various ores, and the desired concentrations thereof, by means of the said adjusting bolts and nuts 10 and 11. A frame 13 carrying a glass plate is adjustably secured above the corrugated shaker plate 9 by means of supporting rods 14 and is secured thereto by means of thumb nuts 15. Frame 13 has mounted thereon a glass or glass plate that entirely covers shaker plate 9, and is adapted to afford an air passage intermediate the same and said shaker plate 9, and by means of the adjusting means referred to the same may be raised or lowered to increase or decrease the air passages, thus increasing or decreasing the force of the air currents as may be desired. The said glass plate also enables the operator to observe the behavior of the ores upon the shaker plate 9.

Shaker plate 9 is moved to and fro by means of a pair of connecting rods 16 secured at one of their terminals to shaker plate 9 by pins 17, while their opposite terminals are secured to the upper ends of a pair of vertically arranged operating bars 18 mounted on a rocker shaft 19, secured in suitable bearings secured to frame of the machine. (See Fig. 5). The rock shaft 19 with the vertically arranged operating bars 18 is operated by means of an eccentric rod or bar 20, operated by an eccentric block 21 mounted on a revoluble shaft 22. The shaft 22 is mounted in suitable bearings on the frame of the machine and is provided on one of its ends with a pulley 23 and a belt passing over the same and over a pulley 24 secured to the end of the shaft 3$^a$ of the suction fan 3 at fan end of machine. Shaker plate 9 being inclined laterally to the right, as well as inclined longitudinally toward the fan end of the machine, as the material enters at the upper left hand corner or portions of shaker plate 9 it will be drawn across and over shaker plate 9 by the force of the air currents, gravity and the inclination and vibration of the shaker plate; whereby the ore will be drawn forwardly and laterally along the shaker plate, a large portion of the ore falling from the shaker plate 9 below into spiral conveyer 25 which is mounted in a suitable casing, and the finished ore carried thereby is conveyed and deposited by said spiral conveyer as finished ore, and the unfinished ore is conveyed to another table for finishing or re-treating.

A spiral conveyer 26 is mounted in a suitable casing directly beneath conveyer 25 and is adapted to receive the less finished ore that may fall into conveyer 25, by removing slides 27; thus by removing slides 27 any unfinished ore from conveyer 25 may be dropped into conveyer 26 and the less finished ore may be taken up and again treated if desired.

Below shaker plate 9 at the fan end of the machine there is a transverse chute 27$^a$ to receive the tailings from shaker plate 9. Directly below chute 27$^a$ are spiral conveyers 28 and 29 (see Fig. 2), thus the tailings from shaker plate 9 fall into chute 27$^a$ and then into conveyer 28, then to some suitable place of deposit, and the less unfinished ore is dropped into conveyer 29 by removing slides 30, when it is then conveyed to some suitable place of deposit where it may be again taken up and retreated if found necessary or desirable.

It will be understood that this is but one unit of a full sized machine, that any number of these machines may be connected and arranged in a series, using some of the units for finishing only. 8 units or 8 tables constitute a complete machine; four of these units or tables are connected direct with the sizing reel 5 by spouting 8; four additional tables or units are added, two of which are retreating tables, and two are finishing tables. The two finishing tables finish treating the ore ready for the smelter; the two finishing tables finish treating all ore from the four tables connected directly with the sizing reel and the two re-treating tables. The two re-treating tables re-treat all ore from the four tables connected directly with the sizing reel that is not sufficiently separated and ready for the two finishing tables. Spiral conveyers 25, 28 and 34 on the four tables connected directly with the sizing reel convey the ore that is best finished to the two finishing tables, and spiral conveyers 26, 29 and 35 convey the less separated ore to the two re-treating tables for re-treatment.

A trunk 31 is mounted in the present instance over and above top part of the machine, and said trunk communicates with the suction fan 3 through the medium of air passage 32. A dividing board or partition 33 is mounted transversely in the turnk 31 and pivotally attached at its lower end adjacent the transverse spiral conveyers 34 and 35. The dividing board or partition 33 is operated by means of an operating rod 36, pivotally attached to the free end thereof and extending to the rear end of the machine. The tailings deposited into conveyer 35 may be returned for further treatment if desired, while conveyer 34 is adapted to catch finished tailings.

37 and 38 are valves mounted transversely in air passage 32. These valves are pivotally attached at their upper ends and when adjusted to the proper position are fastened by means of thumb nuts; said valves being for the purpose of regulating the air passage, or air current 32.

An air passage 39 provided with air tubes 40 (see Fig. 2) communicates with fan 3, and with the air passage above shaker plate 9 under glass plate 13; said air passage is controlled and regulated with valves 41 which are pivotally mounted in the air tubes or passages 40 upon shafts 41$^a$, provided with operating handles 40$^a$, by means of which the volume of air admitted and passing to the suction fan 3 above may be regulated; thus the air is controlled over shaker plate 9.

It will be noticed in Fig. 2 that two fans are shown, 3—3. One fan furnishes the current for the overhead or top current 32, the other fan furnishes the current for the lower air passage 39 over shaker plate 9.

42 is the outlet or exhaust of fans; the dust passes from the fans into the chute or inlet 43 to the dust catcher or arrester which is attached to the fan end of machine; partition 44 is longitudinally arranged in said dust arrester, securely and tightly fastened to the top and ends, and extended to a point below the center, thus making an air break or guide, causing the air carrying the dust to pass thereunder, the air then passes upwardly to outlet or exhaust 45, the dust settling in trunk 46. A dividing board or valve 47 transversely disposed in the bottom is pivotally mounted upon shaft 48 and adjusted by means of operating handle 49; thus if the fans should carry any of the finer ores over, the heavier will drop nearest the machine, and be saved by passing through outlet 50; the lighter dust will be carried over said dividing board and deposited in outlet 51.

The sizing reel (Fig. 3) is inclined and is suitably housed and mounted in the frame of the machine; the driving shaft 52 is mounted in suitable bearings secured to bearing supporting arms 54' carried upon frame of the machine; the driving shaft 52 is adapted to be driven by means of a drive pulley 54 provided with a belt from shaft 56 on conveyer 34. Conveyer 35 is driven by means of a belt from pulleys on conveyers 28 and 29, communicating with any suitable source of power.

22 is the main driving shaft, and from pulley 23 thereon fan shaft 3ª is driven, thus propelling pulley 24. Transverse spiral conveyers 28 and 29 are driven by means of a belt from pulley on shaft 22. Spiral conveyers 25 and 26 are driven by conveyers 28 and 29 by means of bevel gears 59 and 60. Spiral conveyers 34 and 35 may also be driven by belt from pulley 57 on shaft 22 to pulley 58.

The periphery of the sizing reel is preferably octagonal in outline and the reel is divided into sections 61, 62, 63 and 64, to be made in circumference and length as may be desired, according to the quantities of the different sized material that are to be sized; said sections are adapted to separate the material into very fine, fine, medium fine and coarse particles as shown by the meshes of the wire covering. If desired sheet metal may be substituted for the wire covering and provided with perforations corresponding with the meshes of the wire covering.

42ª are adjustable draft checks in the side of the machine located on the right side opposite shaker plate 9 for the purpose of regulating the air current from the fan over said shaker plate.

Having thus described the various parts of our invention, its operation and advantages will be readily understood by those skilled in the art to which it appertains.

Without having attempted to set forth all the forms in which it may be made or all of the modes of its use, we declare that what we claim as our invention, and desire to secure by Letters Patent, is—

1. In a machine of the character described, in combination, a shaker plate, a chute for delivering material thereto, means forming an air passage adjacent the chute adapted to cause a current of air to act upon the material as the latter passes from the chute and during the initial movements of the plate, a second means forming an air passage extending over the plate whereby a current of air may act upon the material while the latter travels across the plate, means for inducing currents of air through the means forming the passages, and means for regulating the currents of air through the means forming the passages.

2. In an ore separating and concentrating machine, the combination with a laterally and longitudinally inclined corrugated shaker plate with a cover thereto forming an air passage chute between said cover and shaker plate, means extending said passage means beyond the plate, a horizontally arranged series of swinging valves, and adjustable draft checks in said extending passage means.

3. In an ore separating and concentrating machine, in combination, a shaker plate, ore supply means therefor, means for operating the plate, means forming an upper air passage communicating with the plate adjacent the ore supply means, a second means forming an air passage extending over the plate, suction fans for inducing currents of air through the aforesaid air passage means, and draft checks disposed off the side of the plate for regulating the currents of air through the air passage means.

In testimony whereof we have affixed our signatures, in presence of two subscribing witnesses.

WILLIAM P. CLIFFORD.
JOHN C. COOK.

Witnesses:
T. F. NORFOLK,
W. L. DUPY.